April 19, 1932. A. E. W. JOHNSON 1,854,904
ROD WEEDER
Filed June 11, 1931  2 Sheets-Sheet 2
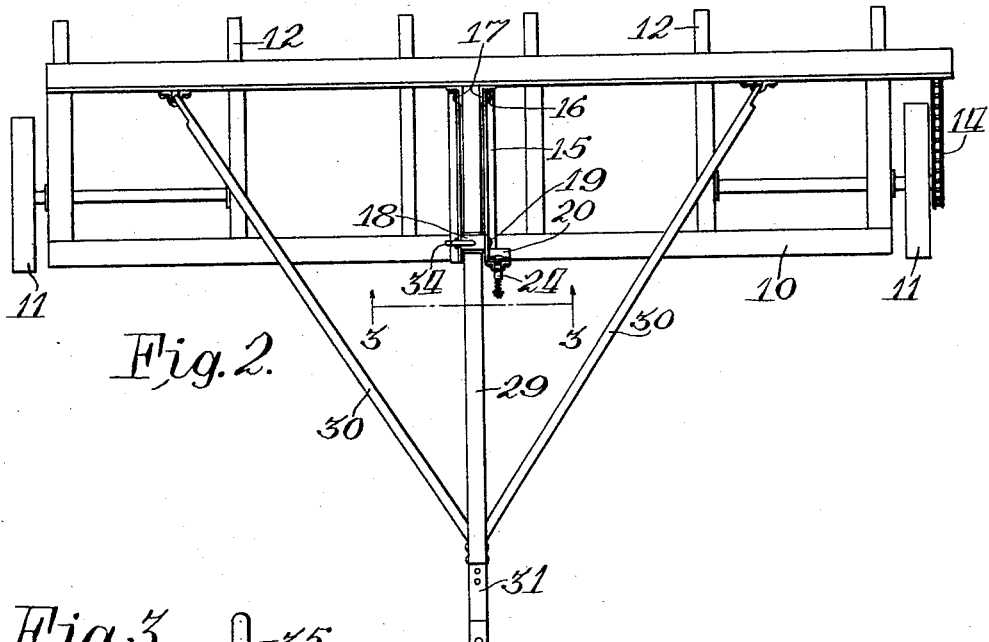
Fig. 2.
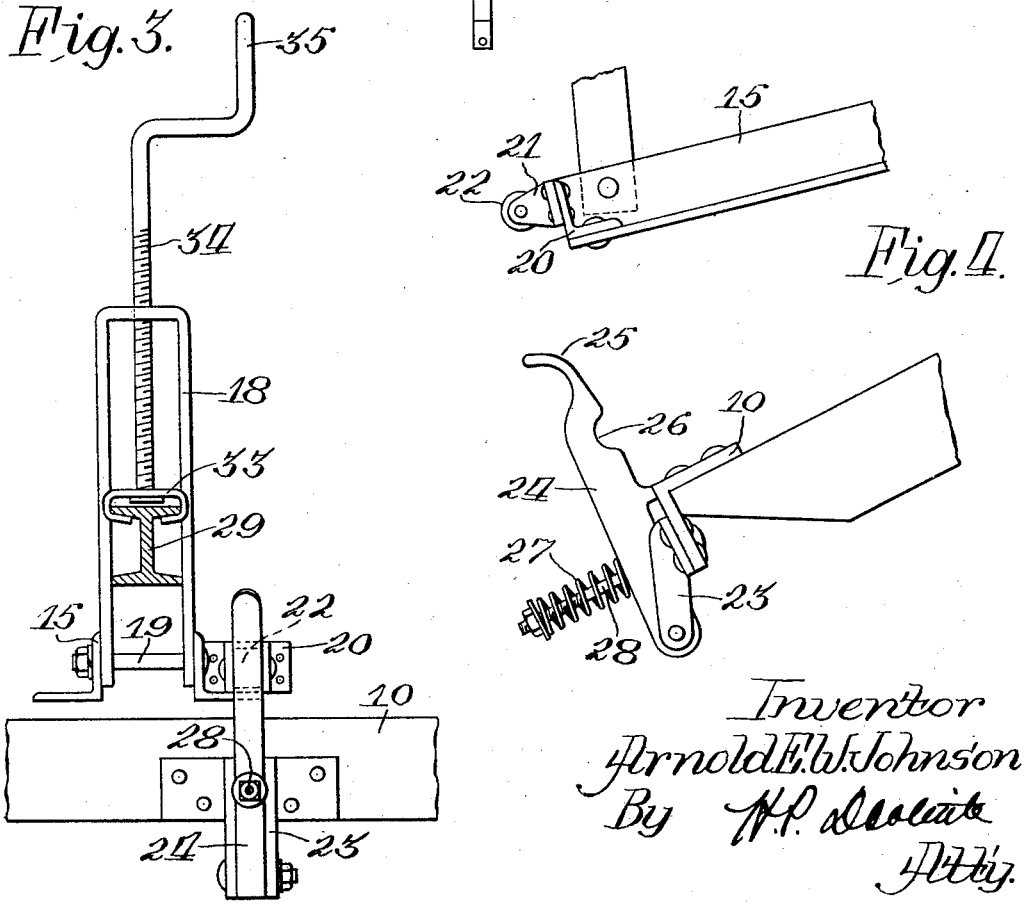
Fig. 3.
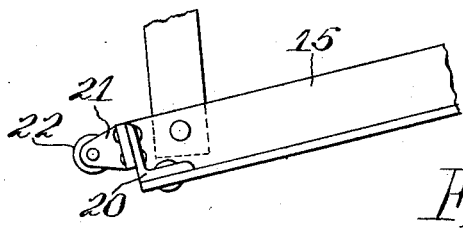
Fig. 4.
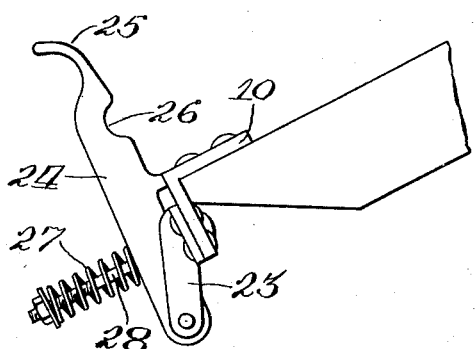
Inventor
Arnold E. W. Johnson
By H. P. Doolittle
Atty.

Patented Apr. 19, 1932

1,854,904

UNITED STATES PATENT OFFICE

ARNOLD E. W. JOHNSON, OF CHICAGO, ILLINOIS, ASSIGNOR TO INTERNATIONAL HARVESTER COMPANY, A CORPORATION OF NEW JERSEY

ROD WEEDER

Application filed June 11, 1931. Serial No. 543,603.

This invention relates to improvements in the construction of tillage implements such as rotary rod weeders.

The main object of the invention is to provide a frame construction which will embody means permitting the implement carrying frame to yield or swing when the implement, as for instance, the rotary rod of a rod weeder, encounters an obstruction and restores it to normal position automatically when the rod has been carried over it.

Another object is to provide a self restoring, releasable coupling for normally locking together certain movable and stationary elements of the frame structure.

The foregoing and other objects and advantages are obtained by the construction hereinafter more particularly defined and claimed, and illustrated in the accompanying drawings, where:

Figure 2 is a plan view of the same;

Figure 3 is an enlarged detail view of the adjusting and latch mechanism, as viewed on the line 3—3, Figure 2; and Figure 4 is an enlarged detail view of the front ends of the frame members carrying the latch device, shown in assembled position in Figure 1.

Figure 1:
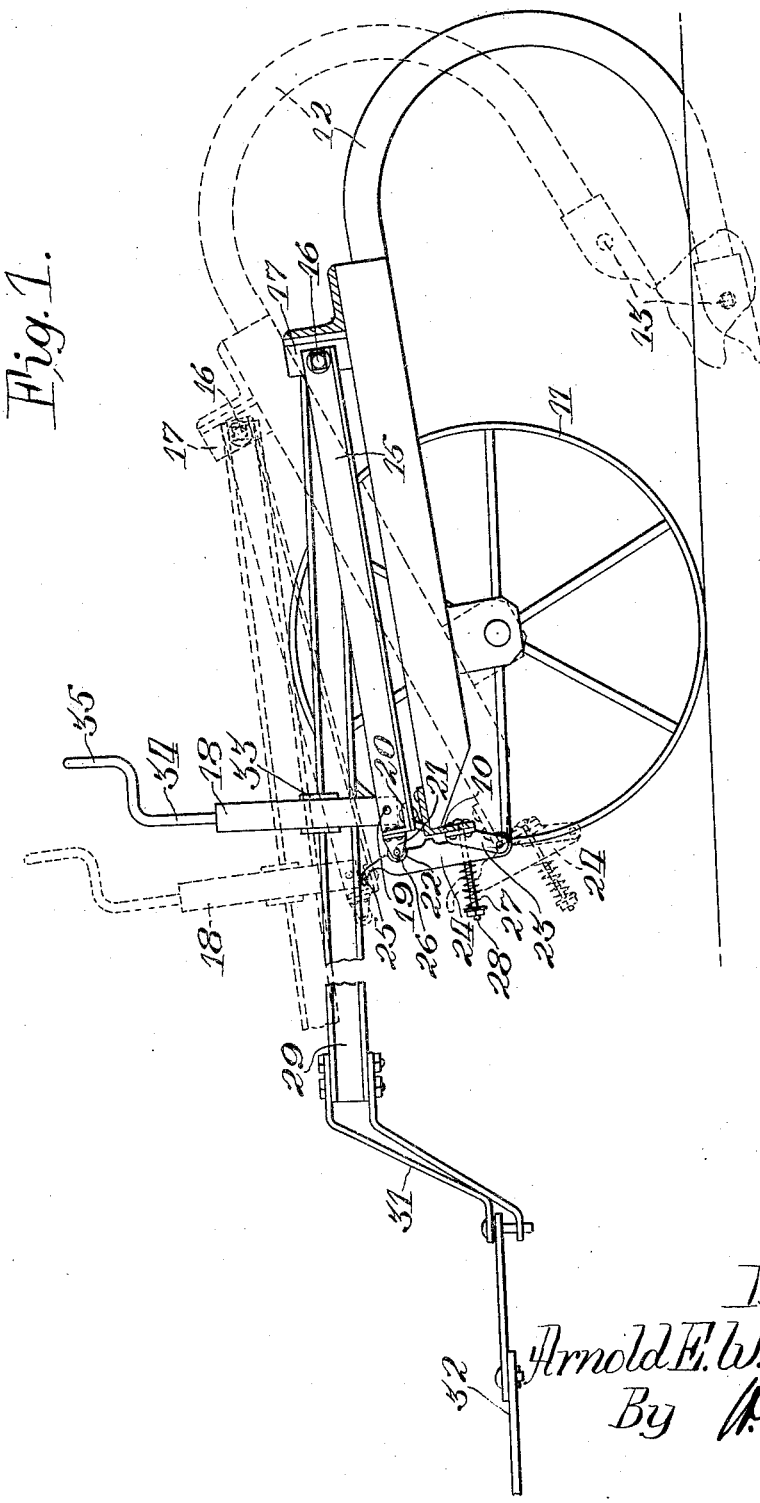
Figure 1 is a side elevation of a rod weeder embodying the invention.

In the present instance the invention has been illustrated as embodied in a rod weeder having a laterally extended main frame 10 supported on end wheels 11, the axis of which is located intermediate the front and rear sides of the frame 10, and preferably forward of the central transverse line of the frame. The frame 10 has secured to it a plurality of downwardly curved standards 12, in the lower ends of which the usual ground engaging rotary rod 13 is journaled. This rod may be driven from one of the wheels by a sprocket chain 14. Centrally of the main frame 10 there is provided an auxiliary frame or member 15, shown in the present instance as comprising a pair of parallel angle bars pivoted at their rear ends to a bolt 16 extending transversely through upstanding brackets 17 at the rear of frame 10. The twin bars of the supplemental frame 15 extend to the forward side of frame 10 where they are connected by an upstanding inverted U-shaped yoke 18 (Figure 3) through a pivot bolt 19. One of the two bars composing the auxiliary frame 15, has secured to it a laterally extending bracket piece 20 carrying parallel forwardly projecting lugs 21, between which there is journaled a latch roller 22. Immediately below a roller 22 the front bar of frame 10 is provided with depending lugs 23, between which there is pivoted an upright latch member or dog 24, the upper end of which is formed with a cam face 25 leading to a rounded notch 26, formed to engage the roller 22. The dog 24 is normally pressed towards the roller by a coil spring 27 carried on a retaining rod 28 projecting forwardly from the front member of the frame 10 through a suitable aperture in the dog 24. With this construction the main and auxiliary frames will normally be locked together in the position shown in full lines on Figure 1 but any abnormal strain applied to the rod 13 tending to force the rear portion of frame 10 upwardly will overcome the pressure of the spring 27, causing the latch device to release and permit the frames to swing to the dotted line positions of Figure 1.

After the obstruction has been passed the overbalancing weight of the rear end of frame 10 will cause the front sides of the frames 10 and 15 to again come together and be automatically relocked in normal position as the cam face 25 of dog 24 rides over roller 22 and it seats in notch 26.

The frames above described are connected to a draft frame which preferably extends above them and which comprises a main central draft member 29, which is preferably pivoted to the main and auxiliary frames 10 and 11 on the same bolt 16 which pivotally connects those frames together. The main draft member 29 has diagonal brace members 30 which are respectively pivoted to the rear side of the frame 10 in transverse axial alignment with the bolt 16, as shown in Figure 2. The main draft member 29 extends forwardly between the arms of the yoke 18 and is provided at its forward end with depending hitch bars 31, which are adapted for connection to a draw bar of a tractor, shown at 32.

In order that the rod carrying frame may be adjusted to raise and lower the rotary rod vertically the draft member 29, at the point where it passes through the yoke 18, has secured to it a bearing piece 33, in which there is swiveled an upright adjusting shaft 34, which passes through a thread aperture in the upper end of the yoke member 18, has a crank handle 35 at its upper end. The shaft 34 is threaded where it passes through the yoke 18 and its rotation by means of the crank handle 35, will cause the auxiliary frame 15 and with it the main frame 10, to be rocked on the axis of the supporting wheels 11 and on the pivot 16, to adjust the position of the rotary rod.

With the construction above described, it will be seen that provision has been made for any desired adjustment of the rod carrying frame and that, independently of such adjustment, the rod carrying frame will be released and allowed to swing when an obstruction is encountered, and will automatically be relocked in normal position when the obstruction is passed. The preferred construction illustrated is obviously susceptible of modification without departure from the scope of the invention as defined in the following claims.

What is claimed is:

1. A rod weeder comprising a horizontally disposed main frame rockably supported on axially aligned end wheels located between its front and rear sides, a ground engaging rotary rod carried by the frame back of said wheels, an auxiliary frame extending fore and aft of the main frame and pivoted thereto on a transverse axis located back of the axis of said wheels, a forwardly extending draft member pivoted to the rear end of the auxiliary frame on a transverse axis, and a vertically adjustable connection between the draft member and the forward end of the auxiliary frame.

2. A rod weeder comprising a horizontally disposed main frame rockably supported on axially aligned end wheels located between its front and rear sides, a ground engaging rotary rod carried by the frame back of said wheels, an auxiliary frame pivoted to the rear side of the main frame on a transverse axis and extending to the front side thereof, an overload release coupling connecting the front side of said frames, and a forwardly extending draft member connected to the auxiliary frame.

3. The combination of claim 2, in which the draft member is pivotally connected to the auxiliary frame at the rear on a transverse axis and connected thereto by a vertically adjustable connection at the front.

4. The combination of claim 2, in which the overload release coupling comprises a spring pressed dog pivoted on one of the frames and a complemental latch piece secured on the other frame.

In testimony whereof I affix my signature.

ARNOLD E. W. JOHNSON.